United States Patent [19]

Howeth

[11] Patent Number: 4,554,494

[45] Date of Patent: Nov. 19, 1985

[54] FLUID LEVEL GAUGE HAVING MAGNETIC SENSOR

[75] Inventor: James R. Howeth, Euless, Tex.

[73] Assignee: Rochester Gauges, Inc., Dallas, Tex.

[21] Appl. No.: 653,869

[22] Filed: Sep. 21, 1984

[51] Int. Cl.[4] .......................... G01F 23/12; H02P 8/00
[52] U.S. Cl. ...................................... 318/482; 73/305;
                                    73/311; 73/314; 340/623
[58] Field of Search ................ 318/482; 340/618, 619,
                     340/623; 73/301, 305, 311, 313, 314

[56] References Cited

U.S. PATENT DOCUMENTS

| 3,326,042 | 6/1967 | Ross et al. | 73/305 X |
| 3,969,941 | 7/1976 | Rapp | 318/482 X |
| 4,466,284 | 8/1984 | Dumery | 73/313 |

FOREIGN PATENT DOCUMENTS

| 58-21125 | 2/1983 | Japan | 73/313 |

*Primary Examiner*—William M. Shoop, Jr.
*Assistant Examiner*—Bentsu Ro
*Attorney, Agent, or Firm*—Richards, Harris, Medlock & Andrews

[57] ABSTRACT

A fluid measurement gauge is principally used to measure the fluid level in large underground storage tanks, such as for storing gasoline at service stations. A housing is positioned vertically in the fluid and includes a leadscrew which is driven by a stepper motor. A nut is mounted for longitudinal movement along the leadscrew. A float encircles the housing and includes a magnet at the surface of the fluid level. A magnetic sensor, such as a Hall-effect switch, is mounted on the nut and driven in selected steps downward to encounter the magnet mounted in the float. A reference position is marked at the top of the housing and the fluid level is measured downward from the reference position by detecting the magnet by operation of the magnetic sensor. An additional float can be provided to detect the interface between two fluids such as gasoline and water. The second float is further provided with a magnet to be detected by the magnetic sensor. In addition, temperature sensors, such as thermistors, can be mounted near the housing to measure the temperature of the fluid for compensation to standard conditions. An electronic circuit board can be included within the fluid measurement gauge to provide an integral unit for making periodic, unattended fluid measurements.

29 Claims, 5 Drawing Figures

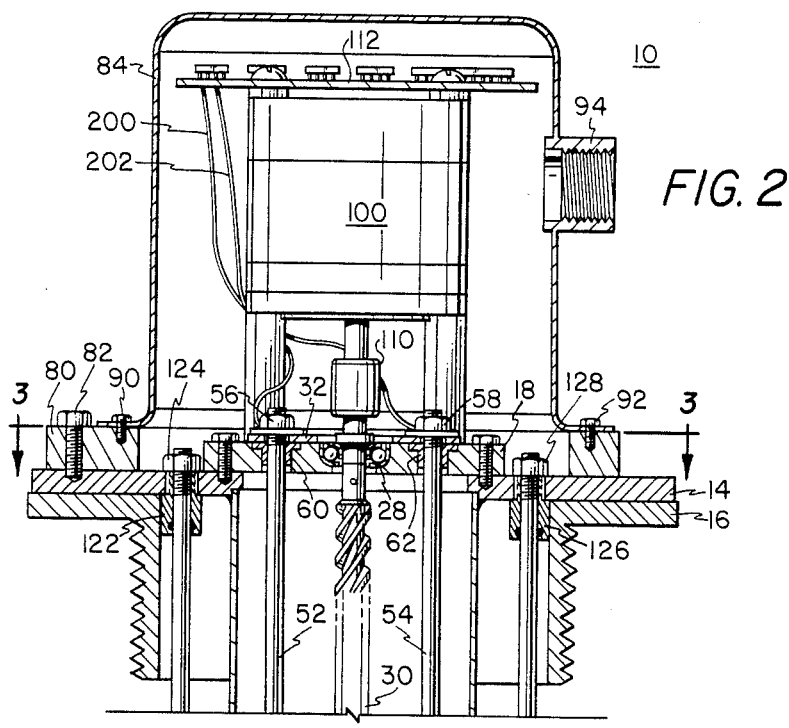
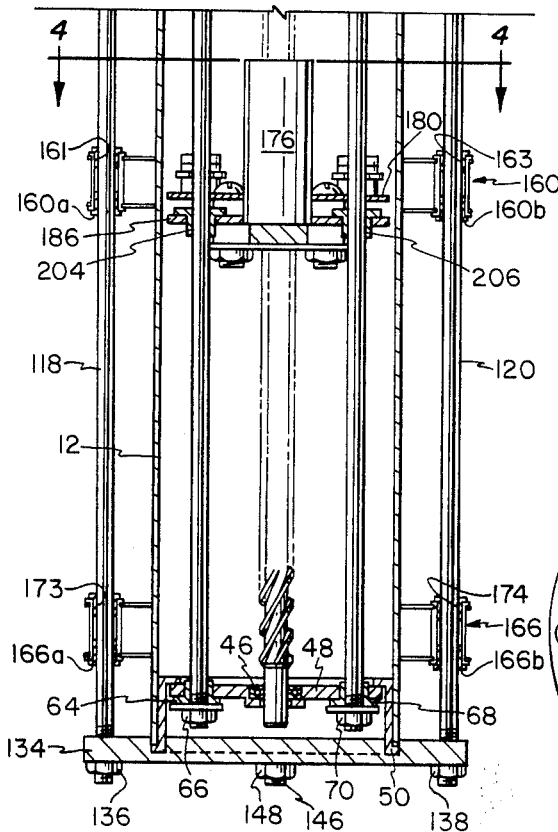
FIG. 2
FIG. 4

FLUID LEVEL GAUGE HAVING MAGNETIC SENSOR

TECHNICAL FIELD

The present invention pertains in general to apparatus for measuring fluid levels and in particular to such apparatus providing self-registration and high accuracy.

BACKGROUND OF THE INVENTION

The stocks of gasoline stored in service station tanks should be accurately and frequently measured to have control of the inventory as well as to detect theft and leakage losses. The most frequent way for measuring the stock of gasoline has been the use of a calibrated pole which is inserted into a gasoline tank by an operator to measure the depth of the gasoline in the tank. This depth reading is then converted to volume. However, this method leaves much to be desired. The accuracy of such measurements is not good. It is difficult to detect a loss of gasoline in a tank due to a slow leak since this could be masked by the actual withdrawal of fluid from the tank. There further needs to be unattended monitoring at frequent intervals to detect theft losses. There is also a need to measure both the level of gasoline and the level of water in the tanks to determine if the gasoline is being replaced with water.

In addition to the calibrated pole, gasoline stocks have been measured by a mechanical float indicator, echo sounding and capacitance measurements. However, all of these measurements suffer from lack of accuracy, mechanical complexity or the need for manual operation. In view of these difficulties there exists a need for a fluid measurement gauge which can periodically and accurately determine the level of fluid in a tank without manual intervention.

SUMMARY OF THE INVENTION

A selected embodiment of the present invention is a fluid measurement gauge which includes a housing for extending into the body of the fluid. A leadscrew is positioned within the housing. A nut is engaged to the leadscrew for longitudinally traversing along the leadscrew in response to rotation of the leadscrew. A motor is provided for rotationally driving the leadscrew. A float is positioned exterior to the housing for floating at the surface of the fluid. A magnet is mounted on the float and a magnetic sensor is mounted to the nut, which is engaged to the leadscrew, for producing a detection signal when the sensor is in the vicinity of the magnet for thereby detecting the surface level of the fluid.

BRIEF DESCRIPTION OF THE DRAWINGS

For a more complete understanding of the present invention and the advantages thereof, reference is now made to the following description taken in conjunction with the accompanying drawings in which:

FIG. 2 is a further sectional elevation view of the fluid measurement gauge shown in FIG. 1 but having the gauge rotated 90 degrees, FIG. 4 is a plan view taken along lines 4—4 for the gauge shown in FIG. 2.

DETAILED DESCRIPTION OF THE INVENTION

Figure 1:
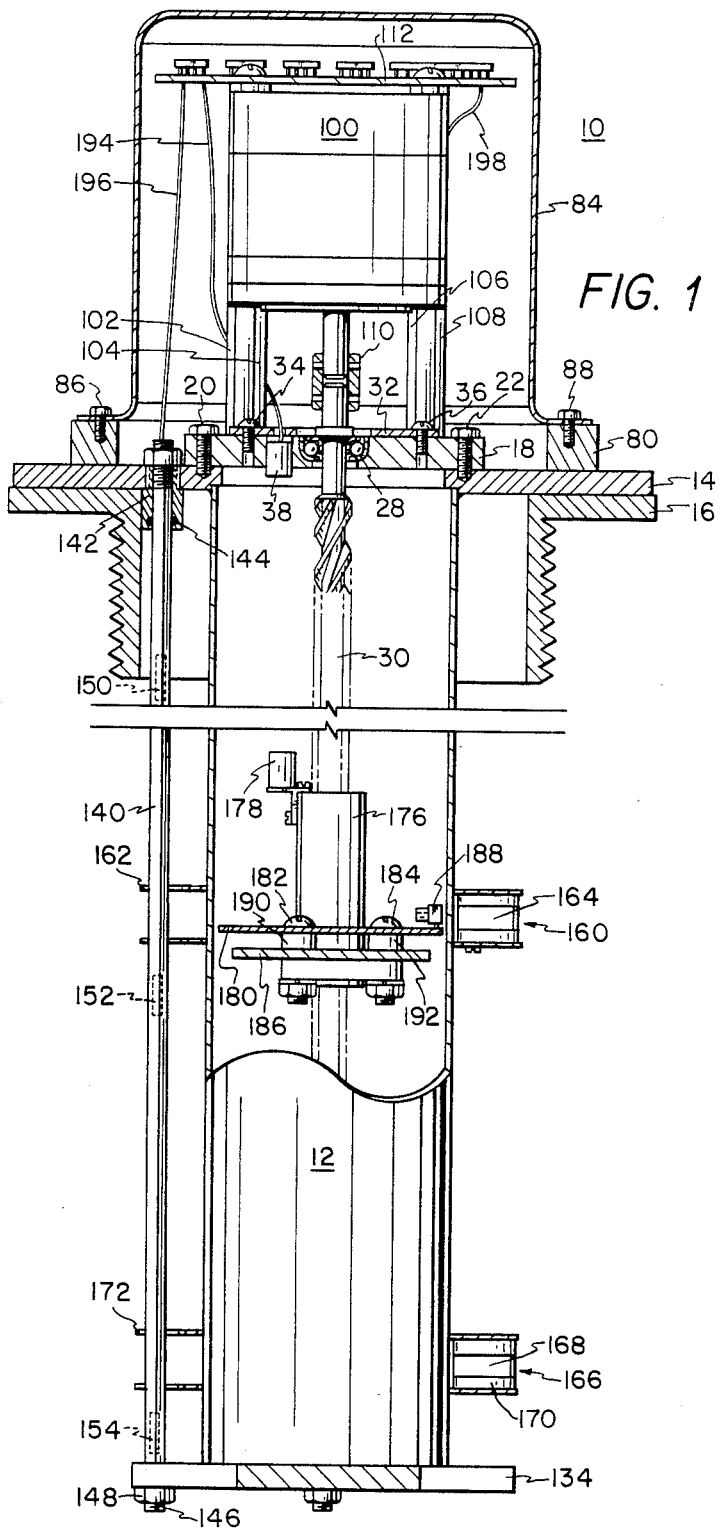
FIG. 1 is a sectional elevation view of a fluid measurement gauge in accordance with the present invention.

Referring now to FIGS. 1 and 2 there is shown a partially sectioned elevated view of a fluid measurement gauge 10 in accordance with the present invention. The gauge 10 includes an elongate cylindrical housing 12 preferably fabricated of stainless steel. The housing 12 is, for example, two and one-half inches in diameter and from five to fifteen feet long. The dimensions, however, are dependent upon the application.

The housing 12 is joined to a top plate 14. An adapter 16 has an upper flange portion thereof bonded to the top plate 14. The lower portion of the adapter 16 has external threads such that the adapter 16 can be threaded into a standard opening for a gasoline storage tank.

A top bearing plate 18 is mounted to the top plate 14 by means of bolts 20 and 22. A top leadscrew bearing 28 is mounted in the top bearing plate 18 for weight-bearing and radial support of a leadscrew 30.

A top printed circuit board 32 is mounted by means of screws 34 and 36 to the top bearing plate 18.

An optical sensor 38 is mounted on the circuit board 32 and extends through the bearing plate 18 within the housing 12. The sensor 38 is, for example, a module H13A1-A13A2 manufactured by General Electric.

The leadscrew 30 is supported on the top leadscrew bearing 28 which is mounted in the top bearing plate 18. A bottom leadscrew bearing 46 is mounted in a bottom bearing plate 48 which is in turn connected by a tension bracket 50 to the housing 12.

Guide rods 52 and 54 are mounted within the housing 12 parallel to the leadscrew 30. Rod 52 extends through the plate 18 and the printed circuit board 32 and is secured in place by a nut 56. The guide rod 54 also extends through the plate 18 and the printed circuit board 32 where it is secured by a nut 58. The guide rod 52 is insulated from the bearing plate 18 by a shoulder insulator 60. Likewise the guide rod 54 is insulated from the bearing plate 18 by a shoulder insulator 62. At the lower end of the housing 62 the guide rod 52 passes through the bottom bearing plate 48, a shoulder insulator 64 where it is secured by a nut 66. The guide rod 54 extends through the plate 48 and a shoulder insulater 68, where it is secured by a nut 70.

A mounting cover plate 80 is secured to the top plate 14 by bolts including 82. A cover 84 is mounted on the adapter plate 80 by screws which include 86, 88, 90 and 92. A conduit adapter 94 is mounted to the cover 84 to provide for the passage of electrical lines through the cover 84.

Within the cover 84 there is provided a stepper motor 100 which is supported by motor standoffs 102, 104, 106 and 108. The standoffs are connected to the top bearing plate 18. The stepper motor 100 is, for example, a model MA61 manufactured by Superior Electric.

The shaft of the motor 100 is connected by a sleeve coupling 110 to the leadscrew 30.

A printed circuit board 112 is mounted on the top of the stepper motor 100 and is provided with various electronic control components.

The gauge 10 is provided with external float guide rods 118 and 120. The rod 118 extends through a rod extension 122 and is secured to the plate 14 by nut 124. Likewise, the guide rod 120 extends through the plate 14 and a guide rod extension 126 and is secured by nut 128.

A bottom-flange plate 134 is connected to the tension bracket 50 and the housing 12. The guide rods 118 and 120 pass through the plate 134 and are secured respectively by nuts 136 and 138.

A thermistor tube 140 is mounted parallel to the housing 12 and extends through a thermistor tube extension 142 within the plate 14 to open within the cover 84. The opening for the thermistor tube 140 is sealed by a thermistor tube O-ring 144. A plug 146 is secured at the bottom end of the thermistor tube 140 which is also provided with a nut 148. Within the tube 140 there are provided three thermistors 150, 152 and 154 for measuring the temperature of the fluid at different depths for temperature compensating the output of the gauge 10.

A cylindrical float 160 encircles the housing 12 and is provided with a clearance notch 162 and holes 161 and 163 which guide rods 118 and 120 pass through to hold the float 160 at a predetermined rotational orientation with respect to the housing 12. The float 160 includes sleeves 160a and 160b which contact the rods 118 and 120. The float 160 includes a magnet 164. The float 160 is free to move up and down on the housing 12 to track the surface of the body of fluid which surrounds the housing 12. A second float 166 has a cylindrical shape and encircles the housing 12 in a similar manner to that of float 160. A magnet 168 is mounted within the float 166. A weight 170 is joined to the float 166 such that it is heavier than the float 160 and seeks the interface level between gasoline and water. The float 160 is designed to float at the surface of gasoline.

A nut 176 is used in conjunction with the leadscrew 30. Nut 176 is longitudinally positioned on the leadscrew 30 in response to rotation of the leadscrew. The leadscrew 30 and the nut 176 comprise a high helix screw and flanged nut which are manufactured by Warner Electric Brake and Clutch Company. An optical interrupter 178 is mounted on the nut 176 and serves to interact with the optical sensor 38 to break a light path thereby indicating the position of the nut 176.

A printed circuit board 180 is mounted to the nut 176 by use of screws 182, 208 and 184 which extend through respective standoffs in which standoffs 190 and 192 are shown for screws 182 and 184. A plate 186 is also connected by the screws 182, 208 and 184 to the nut 176. A Hall-effect switch 188 is mounted on the printed circuit board 180 such that it is adjacent the interior of the housing 12 and can interact to detect the proximity of the magnets 164 and 168. The switch 188 is maintained in a constant orientation relative to the housing 12 such that it is aligned with the magnets 164 and 168. This alignment is maintained by the guide rods 52 and 54.

Float 166 is provided with a clearance notch 172 and holes 173 and 174 which receive guide rods 118 and 120 to maintain a proper orientation about the housing 12.

Sleeve bearings 204 and 206 are mounted to the nut 176 and receive the guide rods 52 and 54.

The optical sensor 38 is connected through a line 194 to the printed circuit board 112. The thermistors 150, 152 and 154 are connected through a line 196 to the printed circuit board 112. The stepper motor 100 is driven by components on the printed circuit board 112 through a line 198. The guide rods 52 and 54 are connected respectively through lines 200 and 202 to the elements on the printed circuit board 112.

Figure 3:
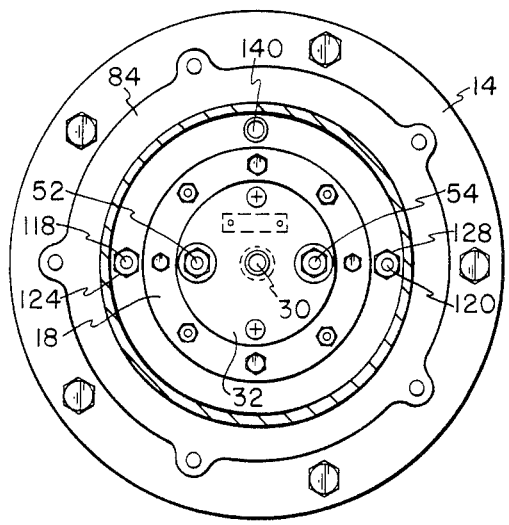
FIG. 3 is a plan view of a section of the gauge taken along lines 3—3 in FIG. 2.

Referring now in addition to FIG. 3, there is shown a section view taken along lines 3—3 of the gauge illustrated in FIG. 2. In this figure there is illustrated the top plate 14, top bearing plate 18, leadscrew 30, guide rods 52 and 54, and the cover 84.

Referring now to FIG. 4 there is illustrated a section view taken along lines 4—4 of the gauge shown in FIG. 2. This particularly shows the arrangement and components mounted on the nut 176. The printed circuit board 180 is secured to the nut 176 by screws 182 and 184 in addition to the screw 208. Brushes 210 and 212 are mounted on the printed circuit board 180 to contact the guide rod 52. The brushes 210 and 212 are electrically connected through a bracket 214 to a terminal screw 216. A line 218 connects the terminal screw 216 to the Hall-effect switch 188.

Brushes 220 and 222 are mounted on the printed circuit board 180 to contact the guide rod 54. A bracket 224 electrically connects the brushes 220 and 222 to a terminal screw 226. A line 228 connects the terminal screw 226 to the Hall-effect device 188.

Figure 5:
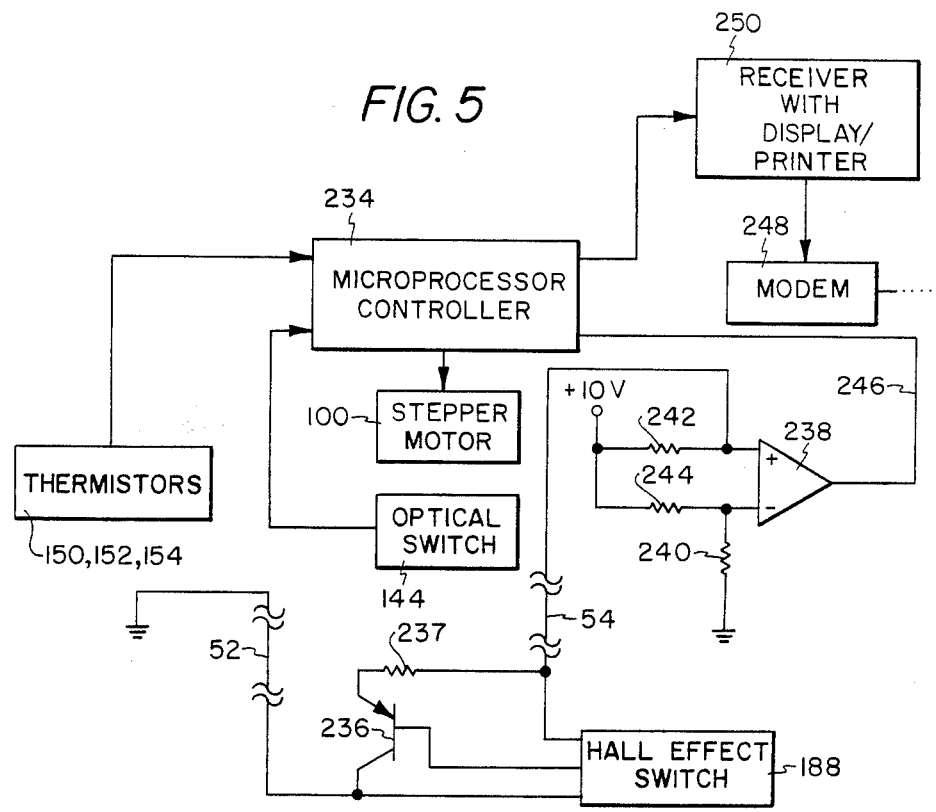
FIG. 5 is a schematic and block diagram of a electronic control and sensor circuit for use with the fluid measurement gauge of the present invention.

The operation of gauge 10 is now briefly described in reference to FIGS. 1, 2, and 5. The gauge 10 is mounted in a fitting on a gasoline storage tank by means of the threads on the adapter 16. The housing 12 extends vertically downward into the fluid in the tank. A selected application is the measurement of the fluid level for a gasoline tank at a service station. Such tanks contain not only gasoline but water at the bottom of the tank. The float 160 settles at the top of the surface of the gasoline while the fluid 166 is weigthed to position itself at the interface between the gasoline and water. To measure the level of the fluids in the tank, the control circuit on the printed circuit board 112 drives the stepper motor 100 to rotate the leadscrew 30 and cause the nut 176 to move upward until the optical interrupter 178 breaks the light beam in the optical sensor 38. When this occurs the nut 176 is known to be at a reference position. The stepper motor 100 is then driven which causes the leadscrew 30 to rotate in a sequence of steps. The number of steps are counted as a measure of the distance of movement of the nut 176 from the reference position. The nut 176 descends until the switch 188 encounters the magnetic field of the magnet 164. The position of first detecting the magnetic field is noted and the nut 176 continues to move downward until the exit from the magnetic field is detected. The midpoint between the two detected points of the magnetic field is determined to be the position of the magnet 164 and therefore the level of the gasoline in the tank. Nut 176 is then driven by the stepper motor 100 downward until the Hall-effect switch 188 comes in proximity to the magnet 168 and again measures the entry and exit from the magnetic field of the magnet 168. The midpoint between these two position measurements is determined to be the interface level between the gasoline and the water. Note that the position level determinations are made by the number of steps applied to the leadscrew 30 by operation of the stepper motor 100. The measured levels can then be transmitted to an external display (not shown) or to any other recording or indicator device as required by the particular application. In a typical application the measurement is made at a periodic interval and recorded to note the withdrawal of the gasoline and to note possible losses when no withdrawals are being made.

Referring now to FIG. 5 there is shown a block and schematic diagram for the electrical and electronic components which are used in conjunction with the gauge 10. A microprocessor controller 234 serves to generate the command for driving the stepper motor 100. Controller 234 is, for example, a model 8048 manufactured by Intel. The controller 234 further monitors the optical sensor 38 to determine when the nut 176 has reached the reference position. The temperature of the fluid in the tank is measured by the thermistors 150, 152 and 154. This temperature measurement is transmitted to the controller 234. The temperature of the fluid is used to correct the level mesurements for changes in temperature.

The guide rods 52 and 54 provide an electrical connection to the circuitry associated with the Hall-effect switch 188. The upper and lower indicated terminals of the switch 188 are connected respectively through the guide rods 52 and 54. Rod 52 is connected to ground. The switch 188 works in conjunction with a transistor 236. The middle terminal of the switch 188 is the switched terminal which is open in the absence of a magnetic field and connected to ground in the presence of a magnetic field. This middle terminal is connected to the base terminal of the transistor 236. The lower terminal of the Hall-effect switch 188 is connected to the collector terminal of transistor 236 and to ground through the rod 52. A resistor 237 is connected between the guide rod 54 and the emitter terminal or transistor 236. When the switch 188 is activated by the presence of a magnetic field the base terminal of transistor 236 is pulled to ground thereby turning on the transistor 236 and decreasing the impedance between rod 54 and ground.

The guide rod 54 is electrically connected the noninverting input of a comparator 238. The negative input of comparator 238 is connected through a resistor 240 to ground. A resistor 242 is connected between a ten volt source and the noninverting input of comparator 238. A resistor 244 is connected between the ten volt source and the inverting input of comparator 238. The output of the comparator 238 is transmitted through a line 246 to the controller 234.

The fluid-level measurements made by the gauge 10 can be transmitted by the microprocessor controller 234 to a receiver 250 display-printer for a local display of the measured fluid levels. From the receiver 250 the fluid level measurements can be provided to a modem 248 for transmission through telephone lines to a central office which monitors the fluid level in the gasoline tanks at a service station.

The electrical operation of the gauge 10 is now described in reference to the FIGURES. The Hall-effect switch 188 works as follows. In the absence of a magnetic field, the base terminal of transistor 236 is at a high voltage, high impedance state. This turns off the transistor 236 which applies a high impedance to the rod 54. Under this condition the voltage at the noninverting input terminal of comparator 238 is at approximatley ten volts. But, the voltage divider action of resistors 244 and 240 produces a voltage of less than ten volts at the inverting input of comparator 238. The resulting output is a high voltage state which is transmitted to the controller 234 to indicate that there is not a magnet in the vicinity of the switch 188. But when the switch 188 does encounter a magnetic field, the base terminal of transistor 236 is pulled to ground thereby activating the transistor 236 to apply a relatively low impedance to the rod 54 and thus to the non-inverting input terminal of comparator 238. This low voltage state is lower than the voltage state at the inverting input terminal of comparator 238 thereby driving the output of the comparator 238 to a low voltage state. When this occurs, it indicates to the controller 234 that the switch 188 has encountered the magnetic field of one of the magnets 164 or 168.

A further description of the operation of the gauge 10 is now made in reference to the FIGURES. For each measurement there must be a reference established for making the linear measurement of the surface level of the float. The controller 234 generates step commands for the motor 100 to draw the nut 176 upward until the optical interrupter 178 enters the optical sensor 38. When this occurs the reference position is establised for the nut 176 and associated switch 188. The controller 234, which is mounted on the printed circuit board 112 then drives the stepper motor 100 in an opposite direction to cause nut 176 to be driven downward. When the switch 188 encounters the first edge of the magnetic field of the magnet 164, the comparator 238 produces a downgoing signal which is transmitted to the controller 234. The position of this occurrence is recorded by the controller 234 in its memory. The controller 234 then continues to drive the nut 176 downward until the switch 188 departs from the magnetic field of the magnet 164. At this point the signal that is the output of the comparator 238 returns to a high voltage state thereby indicating to the controller 234 the position of departure from the magnetic field. The midpoint between these two measurements is then determined to be the level of the gasoline within the storage tank.

In normal operation the switch 188 remains positioned adjacent to the magnet 164. When gasoline is withdrawn from the tank, the float 160 will be lowered and the switch 188 will change state thereby indicating through operation of the comparator 238 that the fluid level has changed. In a preferred method of operation, the controller 234 drives the stepper motor 100 to lower the nut 176 for determining the new fluid level. This hunting for new fluid levels occurs when gasoline is being withdrawn from the tank for sale.

It could also occur if there is a leak from the tank and no gasoline is deliberately being withdrawn.

For certain applications it is desirable to know the level of water in the tank as well. For these applications, the measurement of the upper fluid level is carried out as described above but the nut 176 is further driven to go below the float 160 and detect the magnet 168 carried by the float 166. In a similar manner the upper and lower edges of the magnetic field of the magnet 168 are determined and the midpoint is selected to be the interface level of the water and gasoline. This level is then reported in the same manner as above.

A particularly significant feature of the gauge 10 is the periodic recalibration of the level measurement by movement to the predetermined reference position as indicated by the optical sensor 38. This eliminates any cumulative error buildup which can occur with systems which have only an initial calibration. Further, the use of the incremental stepper motor 100 provides a highly accurate measure of fluid level along the length of the leadscrew 30. A ten foot leadscrew 30 provies essentially the same accuracy as a five foot leadscrew 30. The use of the brushes 210, 212 and 220, 222 eliminates the need for any wiring between the switch 188 and the controller 234. The electrical measurement signals are transmitted through the fixed guide rods 52 and 54. The elimination of moving electrical conductors significantly reduces the failure possibilities of the gauge 10.

Although one embodiment of the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the scope of the invention.

What I claim is:

1. A fluid measurement gauge, comprising:
   a housing for extending into a fluid,
   a leadscrew within said housing,
   means for rotationally driving said leadscrew,
   means threadably engaged to said leadscrew for longitudinally traversing along said leadscrew in response to rotation of said leadscrew,
   a float positioned exterior to said housing for floating at the surface of said fluid,
   a magnet mounted to said float, and
   a magnetic sensor mounted to said means engaged to said leadscrew for producing a detection signal when said sensor is in the vicinity of said magnet for detecting the level of said fluid.

2. A fluid measurement gauge as recited in claim 1 wherein said housing comprises a fluid-tight, elongate cylinder vertically extending into said fluid.

3. A fluid measurement gauge as recited in claim 1 wherein said leadscrew is mounted coaxially within said housing to extend substantially the length of said housing.

4. A fluid measurement gauge as recited in claim 1 wherein said means engaged to said leadscrew is a nut threaded on said leadscrew.

5. A fluid measurement gauge as recited in claim 1 wherein said means for rotationally driving said leadscrew is a stepper motor.

6. A fluid measurement gauge as recited in claim 1 wherein said float comprises a ring which encircles said housing.

7. A fluid measurement gauge as recited in claim 1 wherein said magnetic sensor comprises a Hall-effect device for detecting the proximity of said magnet.

8. A fluid measurement gauge as recited in claim 1, including:
   a second float positioned exterior to said housing and below said first float, said second float for floating at the interface of two fluids, and
   a second magnet mounted on said second float.

9. A fluid measurement gauge as recited in claim 1 including at least one guide rod within said housing, said guide rod parallel to said leadscrew and positioned to prevent rotation of said means engaged to said leadscrew relative to said housing.

10. A fluid measurement gauge as recited in claim 1 including an electronic module for controlling said means for rotationally driving said leadscrew and for receiving said detection signal produced by said magnetic sensor.

11. A fluid measurement gauge as recited in claim 1 including at least one guide rod within, but electrically insulated from said housing, for preventing rotation of said means engaged to said leadscrew and for transmitting said detection signal through said guide rod.

12. A fluid measurement gauge as recited in claim 11 including brushes mounted on said means engaged to said leadscrew and touching said guide rod for providing an electrical path from said magnetic sensor to said guide rod.

13. A fluid measurement gauge as recited in claim 1 including top and bottom plates for closing said housing.

14. A fluid measurement gauge as recited in claim 1 including at least one guide rod mounted exterior to said housing for positioning said float relative to said housing.

15. A fluid measurement gauge as recited in claim 1 including a temperature sensor mounted to said housing on the exterior thereof for measuring the temperature of said fluid.

16. A fluid measurement gauge as recited in claim 15 including means for detecting when said means engaged to said leadscrew is at a predetermined reference position.

17. A fluid measurement gauge as recited in claim 16 wherein said means for detecting comprises an optical sensor which generates a reference position signal when said means engaged to said leadscrew reaches said predetermined reference position.

18. A fluid measurement gauge, comprising:
    an elongate cylindrical housing for extending vertically into a body of fluid,
    a leadscrew extending coaxially within said housing,
    a motor connected to rotationally drive said leadscrew,
    a nut threadedly engaged to said leadscrew for longitudinally traversing said leadscrew when said leadscrew is rotated relative to said nut,
    a float encircling said housing and floating at the surface of said fluid,
    a magnet mounted to said float,
    a magnetic sensor mounted on said nut for generating a detection signal when said magnet is in the vicinity of said sensor for detecting the level of said fluid, and
    means for electrically communicating said detection signal from said magnetic sensor to outside said housing.

19. A fluid measurement gauge as recited in claim 18 wherein said motor is an electrical stepper motor.

20. A fluid measurement gauge as recited in claim 18 wherein said magnetic sensor is a Hall-effect device for detecting the proximity of said magnet.

21. A fluid measurement gauge as recited in claim 18 wherein said means for electrically communicating comprises first and second guide rods mounted inside said housing parallel to said leadscrew and positioned to prevent rotation of said nut relative to said guide rods, at least one of said guide rods electrically insulated from said housing.

22. A fluid measurement gauge as recited in claim 21 including brushes mounted on said nut and touching said guide rods for providing electrical communication between said magnetic sensor and said guide rods.

23. A fluid measurement gauge as recited in claim 18, including:
    a second float encircling said housing and positioned below said first float, and
    a second magnet mounted on said second float.

24. A fluid measurement gauge as recited in claim 18 including top and bottom plates for closing said housing.

25. A fluid measurement gauge as recited in claim 18 including a guide rod exterior to said housing for positioning said float relative to said housing.

26. A fluid measurement gauge as recited in claim 18 including a temperature sensor mounted to said housing on the exterior thereof for measuring the temperature of said fluid.

27. A fluid measurement gauge as recited in claim 18 including means for detecting when said nut is at a predetermined reference position.

28. A fluid measurement gauge as recited in claim 27 wherein said means for detecting comprises an optical sensor which generates a reference position signal when said nut reaches said predetermined reference position.

29. A fluid measurement gauge, comprising:
an elongate, fluid-tight cylindrical housing for extending vertically into a body of fluid,
a leadscrew mounted coaxially within said housing and supported by upper and lower bearings,
a stepper motor connected to rotationally drive said leadscrew,
a nut threadedly engaged to said leadscrew for longitudinally traversing said leadscrew when said leadscrew is rotated relative to said nut,
first and second guide rods within said housing parallel to said leadscrew and positioned to prevent rotation of said nut, at least one of said guide rods electrically insulated from said housing, said guide rods serving as electrical conduction paths,
a float encircling said housing and floating at the surface of said fluid,
a magnet mounted to said float,
a Hall-effect magnetic sensor mounted on said nut for generating a detection signal when said magnet is in the vicinity of said sensor for detecting the level of said fluid,
brushes connected to said magnetic sensor and touching said guide rods for transmitting said detection signal from said sensor to said guide rods, and
an optical sensor for generating a reference position signal when said magnetic sensor reaches a predetermined reference position wherein said fluid level is measured as the distance from said reference position to a position of said magnetic sensor where said detection signal is generated.

* * * * *